United States Patent
Liu et al.

(10) Patent No.: US 12,291,597 B2
(45) Date of Patent: May 6, 2025

(54) POLYBUTYLENE TEREPHTHALATE COMPOSITION AND ARTICLE THEREOF

(71) Applicant: BASF SE, Ludwigshafen (DE)

(72) Inventors: Chao Liu, Shanghai (CN); Qiong Jie Han, Shanghai (CN); Roland Helmut Kraemer, Lemfoerde (DE); Zhen Ke Wei, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 52 days.

(21) Appl. No.: 17/766,627

(22) PCT Filed: Oct. 13, 2020

(86) PCT No.: PCT/EP2020/078802
§ 371 (c)(1),
(2) Date: Apr. 5, 2022

(87) PCT Pub. No.: WO2021/074165
PCT Pub. Date: Apr. 22, 2021

(65) Prior Publication Data
US 2024/0076444 A1 Mar. 7, 2024

(30) Foreign Application Priority Data
Oct. 16, 2019 (WO) ................ PCT/CN2019/111503

(51) Int. Cl.
| | |
|---|---|
| *C08L 25/10* | (2006.01) |
| *C08G 63/183* | (2006.01) |
| *C08K 7/14* | (2006.01) |
| *C08K 7/28* | (2006.01) |
| *C08L 25/14* | (2006.01) |
| *C08L 55/02* | (2006.01) |
| *C08L 67/02* | (2006.01) |

(52) U.S. Cl.
CPC .............. *C08G 63/183* (2013.01); *C08K 7/14* (2013.01); *C08K 7/28* (2013.01); *C08L 25/10* (2013.01); *C08L 25/14* (2013.01); *C08L 55/02* (2013.01); *C08L 67/02* (2013.01); *C08L 2203/20* (2013.01); *C08L 2205/025* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 4,753,986 A | * | 6/1988 | Wang | ...... C08L 67/02 525/64 |
| 2010/0160529 A1 | * | 6/2010 | Lee | ......... C08L 67/02 524/494 |
| 2011/0144239 A1 | | 6/2011 | Lee et al. | |
| 2020/0140679 A1 | * | 5/2020 | Peng | ............ B29C 45/14311 |

FOREIGN PATENT DOCUMENTS

| | | |
|---|---|---|
| EP | 0348565 A1 | 1/1990 |
| EP | 0985692 A2 | 3/2000 |
| EP | 1514883 A1 | 3/2005 |
| JP | 2002-294054 A | 10/2002 |
| JP | 2013-131576 A | 7/2013 |
| WO | WO-2018/196539 A1 | 11/2018 |
| WO | WO-2019/130269 A1 | 7/2019 |

OTHER PUBLICATIONS

International Application No. PCT/EP2020/078802, International Search Report and Written Opinion, mailed Jan. 19, 2021.

* cited by examiner

*Primary Examiner* — Richard A. Huhn
(74) *Attorney, Agent, or Firm* — Grüneberg and Myers PLLC

(57) ABSTRACT

The present invention relates to a polybutylene terephthalate composition, and an article derived from the polybutylene terephthalate composition comprising as component (A) polybutylene terephthalate (PBT) resin, as component (B) vinyl aromatic-based polymer comprising units which are derived from vinyl aromatic monomers, and as component (C) reinforcement agent.

21 Claims, No Drawings

POLYBUTYLENE TEREPHTHALATE COMPOSITION AND ARTICLE THEREOF

CROSS-REFERENCE TO RELATED APPLICATIONS

This is the U.S. national phase of International Application No. PCT/EP2020/078802, filed Oct. 13, 2020, which claims the benefit of International Patent Application No. PCT/CN2019/111503, filed on Oct. 16, 2019.

FIELD OF THE INVENTION

The present invention relates to a polybutylene terephthalate composition, and an article derived from the polybutylene terephthalate composition.

DESCRIPTION OF THE RELATED ART

With the development of high frequency communication technology, traditional material gradually can't meet the demand in electronic industry such as antenna housing, mobile device and integrated circuit. Meanwhile thermoplastic resin gradually shows its benefits of design flexibility and excellent performances. Polybutylene terephthalate (PBT) resin is a common category duo to its high performance in mechanical property and processing advantage. However, it's quite challenging to make a PBT composition, especially glass reinforced composition with desirable low dielectric property.

Dielectric property refers to the extent to which a material concentrates electric flux and the energy loss rate, usually expressed as dielectric constant DK and dissipation factor DF. High dielectric constant and dissipation factor of PBT composition, in and of itself, is not necessarily desirable for high frequency communication industry. As the increase of DK and DF, the electric flux density and energy loss increases. The accumulation of charge will disturb the signal transmission, reduce the reliability of electric circuit, limit the further increase of frequency. Low dissipation factor is the desirable property for PBT composition when applied to high frequency communication industry.

WO 2018/196539 disclosed a low dielectric composition, comprising 45 wt % to 70 wt % of PBT and/or PPS, 20 wt % to 45 wt % of chopped glass fiber, 1 wt % to 3 wt % of toughing resin, 0.2 wt % to 0.5 wt % unmodified glycidyl methacrylate. $D_K$ of the chopped glass fiber is 4.0-4.4 under 1 MHz. The invention disclosed that unmodified glycidyl methacrylate together with chopped glass fiber could improve the dielectronic property of PBT.

JP2013131576A disclosed a resin component used as high frequency signal transmission component, comprising a PBT resin, an olefin resin and a fibrous inorganic filler. Polypropylene is known as olefin resin with low $D_K$ and $D_F$. However, the mechanical property of the composition rapidly decreases by the addition of polypropylene.

Miniaturization and high density of electronic components is the trend of E&E field, such as in thin wall article, which rapidly promote the efficiency while bring component heating problem as well. Materials with lower $D_F$ could conquer the heating problem effectively.

Meanwhile, it's also required the good mechanical and processing property of the polybutylene terephthalate composition, especially the bonding strength with the metal units.

Thus, there is still a need for decreasing the dissipation factor of the polybutylene terephthalate composition and maintaining the good mechanical property thereof.

SUMMARY OF THE INVENTION AND ADVANTAGES

The aim of the present invention is therefore to provide a polybutylene terephthalate composition, which shows much lower dissipation factor as well as good mechanical property, and thereby less problems when applied into high frequency communication articles.

This aim has been achieved with the polybutylene terephthalate composition according to the invention, comprising as component (A) at least one polybutylene terephthalate (PBT) resin, as component (B) at least one vinyl aromatic-based polymer comprising units which are derived from vinyl aromatic monomers, and as component (C) at least one reinforcement agent.

The other aim of the present invention is therefore to provide an article which is prepared by the PBT composition according to the present invention.

The other aim of the present invention is to provide a process for preparing the polybutylene terephthalate composition according to the invention.

The other aim of the present invention is to provide a use the vinyl aromatic-based polymer (B) in decreasing dielectric constant and dielectric loss of polybutylene terephthalate resin.

The other aim of the present invention is to provide a use of the polybutylene terephthalate composition as materials of parts or components of frame, housing or package of mobiles, sensors or laptops, or antenna of mobiles or vehicles.

In the invention, the terms "a", "an" and "the" are used interchangeable with the term "at least one". The phrases "at least one of" and "comprises at least one of" followed by a list refers to any one of the items in the list and any combination of two or more item in the list. All numerical ranges are inclusive of their endpoints and non-integral values between the endpoints unless otherwise stated.

The terms "first", "second" and "third" are used in this disclosure merely as a matter of convenience in the description of one or more of the embodiments. It will be understood that, unless otherwise noted, those terms are used in their relative sense only.

DETAILED DESCRIPTION OF THE INVENTION

The present invention is to provide a polybutylene terephthalate composition, comprising as component (A) at least one polybutylene terephthalate (PBT) resin, as component (B) at least one vinyl aromatic-based polymer comprising units which are derived from vinyl aromatic monomers, and as component (C) at least one reinforcement agent.

Polybutylene Terephthalate Resin (A)

The polybutylene terephthalate composition according to the present invention contains a polybutylene terephthalate resin(A). The polybutylene terephthalate resin includes a homo-polyester or co-polyester of polybutylene terephthalate (a polybutylene terephthalate, a polybutylene terephthalate co-polyester). The polybutylene terephthalate resin contains a butylene terephthalate as a main component, which is obtainable by a common method, for example by the polycondensation of polymerization monomers comprising a first dicarboxylic acid component including at least one terephthalic acid and/or the ester derivative thereof and a first glycol component including at least one 1,4-butane diol and/or the ester derivative thereof.

Any known polybutylene terephthalate resin could be used in the present invention, the present invention is not limited in crystallization property, kind or amount of a terminal group of the polybutylene terephthalate, intrinsic viscosity, molecular weight, linear or branched structure, kind or amount of a polymerization catalyst, and a polymerization method.

The polybutylene terephthalate resin may include units derived from other monomers excluding terephthalic acid, the ester derivative thereof, 1,4-butane diol or the ester derivative thereof within the range not impairing the characteristics. For example, the other monomers are preferable in an amount of less than or equal to 40 mol %, particularly less than or equal to 20 mol %, based on the total monomers constituting the polybutylene terephthalate resin.

Examples of the other monomers include aliphatic dicarboxylic acids having up to 20 carbon atoms, cycloaliphatic dicarboxylic acids having 7 to 12 carbon atoms, and/or aromatic dicarboxylic acids having 8 to 16 carbon atoms, preferably is selected from the group consisting of succinic acid, glutaric acid, adipic acid, pimelic acid, suberic acid, sebacic acid, azelaic acid, undecanedicarboxylic acid, dodecanedicarboxylic acid, tridecanedioic acid, tetradecanedioic acid, pentadecanoic acid, hexadecanedicarboxylic acid, dimeric acid, isophthalic acid, phthalic acid, 2,6-naphthalene dicarboxylic acid, hexahydrophthalic acid, hexahydroisophthalic acid, hexahydroterephthalic acid, 1,2-cyclopentanedicarboxylic acid, 1,3-cyclopentanedicarboxylic acid, himic acid, 4,4'-diphenyldicarboxylic acid, 4,4'-diphenyletherdicarboxylic acid, 4,4'-diphenylmethanedicarboxylic acid and 4,4'-diphenylketonedicarboxylic acid, more preferably is succinic acid, glutaric acid, adipic acid, pimelic acid, isophthalic acid and/or phthalic acid. These other monomers may be used singly alone, or by mixing two or more kinds thereof.

Examples of the other monomers include aliphatic glycol having 2 to 12 carbon atoms, cycloaliphatic glycol having 6 to 12 carbon atoms, polyoxyalkylene glycol having a plurality of oxyalkylene units of which the carbon atom number is 2 to 4, and/or aromatic glycol having 6 to 14 carbon atoms, preferably is selected from the group consisting of ethylene glycol, propylene glycol, 1,3-butylene glycol, trimethylene glycol, 1,6-hexanediol, neopentanediol, 1,3-octanediol, diethylene glycol, triethylene glycol, dipropylene glycol, tripropylene glycol, ditetramethylene glycol, decanediol, 1,4-cyclohexanediol, 1,4-cyclohexanedimethanol, bis-1,4-(hydroxymethyl)cyclohexane, diethylene glycol, polytetramethylene glycol, bisphenols, xylylene glycol and naphthalenediol, more preferably is ethylene glycol and/or diethylene glycol. These other monomers may be used singly alone, or by mixing two or more kinds thereof.

Examples of the polybutylene terephthalate resin include polybutylene terephthalate, polybutylene(terephthalate/isophthalate), polybutylene (terephthalate/adipate), polybutylene (terephthalate/sebacate), polybutylene (terephthalate/decane dicarboxylate), polybutylene (terephthalate/naphthalate) and poly(butylene/ethylene) terephthalate.

The viscosity number of the polybutylene terephthalate resin is suitable in the range from 90 to 170 cm 3/g, preferably from 100 to 135 cm 3/g, more preferably from 100 to 120 cm 3/g, measured in a 0.005 g/ml phenol/1,2-dichlorobenzene solution (1:1 mass ratio), according to ISO 1628-5.

The polybutylene terephthalate composition preferably comprises from 20 wt % to 80 wt % of the polybutylene terephthalate resin based on the total weight of the polybutylene terephthalate composition. For example, the polybutylene terephthalate resin disclosed herein may be in the range from 20 wt % to 70 wt %, 20 wt % to 60 wt %, 20 wt % to 50 wt %, 20 wt % to 40 wt %, based on the total weight of the polybutylene terephthalate composition.

In one embodiment of the invention, the polybutylene terephthalate resin is linear polybutylene terephthalate resin.

Vinyl Aromatic-Based Polymer (B)

The polybutylene terephthalate composition according to the present invention contains at least one vinyl aromatic-based polymer (B-1) and/or (B-2).

The vinyl aromatic-based polymer (B-1)

The vinyl aromatic-based polymer (B-1) comprises units derived from about 50 mol % to about 100 mol %, preferably from 60 mol % to 99.5 mol %, most preferably from 70 mol % to 99.5 mol % of at least one vinyl aromatic monomer (b1), based on the total monomers which constitutes the vinyl aromatic-based polymer (B-1).

In one preferred embodiment of the present invention, the vinyl aromatic-based polymer (B-1) could also comprise units derived from at least one ethylenically unsaturated monomer (b2) and/or at least one conjugated diene monomer (b3).

Suitable vinyl aromatic monomers (b1) include monomers corresponding to the Formula I:

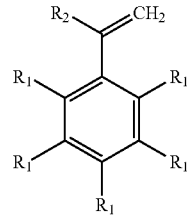

Formula I wherein $R_1$ is same or different and is selected from the group consisting of hydrogen, $C_1$-$C_{10}$ alkyl group, $C_1$-$C_6$ alkenyl group, $C_4$-$C_{10}$ cycloaliphatic group, $C_6$-$C_{12}$ aromatic hydrocarbon group, $C_1$-$C_4$ alkoxy group and halogen atoms, preferably is hydrogen, $C_1$-$C_{10}$ alkyl group and/or halogen atoms, more preferably is hydrogen and/or $C_1$-$C_4$ alkyl group, most preferably is hydrogen, methyl group and/or ethyl group; $R_2$ is hydrogen and/or $C_1$-$C_4$ alkyl group, preferably is hydrogen, methyl group and/or ethyl group.

Examples of the vinyl aromatic monomer (b1) are styrene, alpha-methylstyrene, 2-methylstyrene, 3-methylstyrene, 4-methylstyrene, 2,4-dimethylstyrene, 2,5-dimethylstyrene, para-alpha-dimethylstyrene, 2-ethylstyrene, 3-ethylstyrene, 4-ethyl styrene, 2-isopropyl styrene, 3-isopropyl styrene, 4-isopropyl styrene, ortho-divinylbenzene, meta-divinylbenzene, para-divinyl benzene, ethoxy styrene, chlorostyrene, bromostyrene, di bromostyrene, dichlorostyrene, tribromostyrene, trichlorostyrene, 2-vinylnaphthalene and 2-isopropenylnaphthalene, preferably is styrene, alpha-methylstyrene, 4-methylstyrene, chlorostyrene, para-divinylbenzene, bromostyrene, dibromostyrene, trichlorostyrene, 2-vinyl naphthalene and/or 2-isopropenylnaphthalene, more preferably is styrene, alpha-methylstyrene and/or 4-methylstyrene.

The vinyl aromatic-based polymer (B-1) could also comprises units derived from at least one ethylenically unsaturated monomer (b2) and/or one conjugated diene monomer (b3).

As the ethylenically unsaturated monomer (b2), one having favorable compatibility with the polybutylene terephthalate resin is preferred. The ethylenically unsaturated monomer (b2) in the vinyl aromatic-based polymer (B-1) is preferably ethylenically unsaturated nitrile monomer, ethylenically unsaturated acid monomer and derivative thereof. The derivative of the ethylenically unsaturated acid monomer is preferably acid anhydride, ester, melt salt, amide, imide and/or epoxy compound of the ethylenically unsaturated acid, and/or the like, more preferably is acid anhydride, ester or epoxy compound of the ethylenically unsaturated acid.

In one preferred embodiment, the vinyl aromatic-based polymer (B-1) is constituted of the vinyl aromatic monomer (b1) and first ethylenically unsaturated monomer (b2), which is selected from ethylenically unsaturated acid monomer, acid anhydride, and/or epoxy compound of the ethylenically unsaturated acid, and optionally second ethylenically unsaturated monomer (b2), which is selected from ethylenically unsaturated nitrile monomer and/or ester of the ethylenically unsaturated acid. The vinyl aromatic-based polymer (B-1) disclosed herein may be in the range from 2 to 10 wt %, based on the total weight of the polybutylene terephthalate composition.

The ethylenically unsaturated nitrile monomer is preferably selected from the group consisting of acrylonitrile, methacrylonitrile, fumaronitrile and a-cyanoethylacrylonitrile, more preferably is acrylonitrile and/or methacrylonitrile, most preferably is acrylonitrile.

The ethylenically unsaturated acid monomer has at least one carbon-carbon double bond and at least one acid group, such as carboxyl or sulfonic group, preferable is ethylenically unsaturated carboxylic acid monomer. Examples of ethylenically unsaturated carboxylic acid monomer are mono-olefinic and polyolefinic unsaturated mono-, and poly-carboxylic acid(di-, tri-carboxylic acid), preferably is selected from the group consisting of acrylic acid, methacrylic acid, 2-chloroacrylic acid, 2-ethylacrylic acid, angelic acid, crotonic acid, isocrotonic acid, cinnamic acid, p-chloro cinnamic acid, sorbic acid, alpha-chloro sorbic acid, alpha-cyano acrylic acid, maleic acid, fumaric acid, itaconic acid, citraconic acid, mesaconic acid, glutaconic acid, 3-(acryloyloxy)propanoic acid, 3,4,5,6-tetrahydrophthalic acid, 1,2,3,6-tetrahydrophthalic acid, bicyclo (2.2.2)-octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo (2.2.1) octa-7-ene-2,3,5,6-tetracarboxylic acid, maleopimaric acid, 7-oxabicyclo (2.2.1) hepta-5-ene-2,3-dicarboxylic acid and aconitic acid, more preferably is acrylic acid, methacrylic acid, maleic acid, fumaric acid and/or citraconic acid.

The acid anhydride of the ethylenically unsaturated carboxylic acid which doesn't impair the compatibility with the polybutylene terephthalate resin is preferably used. Examples of the acid anhydride of the ethylenically unsaturated carboxylic acid are maleic anhydride (MAH), acrylic anhydride, methacrylic anhydride, 4-methyl cyclohex-4-ene-1,2-dicarboxylic acid anhydride, itaconic anhydride, citraconic anhydride, fumaric anhydride, 3,4,5,6-tetrahydrophthalic anhydride, 1,2,3,6-tetrahydrophthalic anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tnorborn-5-ene-2,3-dicarboxylic acid anhydride, nadic anhydride, methyl nadic anhydride, himic anhydride, methyl himic anhydride and/or x-methylbicyclo(2.2.1)hept-5-ene-2,3-dicarboxylic acid anhydride (XMNA), more preferably is maleic anhydride, (meth)acrylic anhydride and/or fumaric anhydride.

The ester of the ethylenically unsaturated acid which doesn't impair the compatibility with the polybutylene terephthalate resin is preferably used, preferably is an alkyl ester and/or a hydroxy alkyl ester of the ethylenically unsaturated acid, such as $C_1$-$C_{18}$, more preferably $C_1$-$C_{12}$, most preferably $C_1$-$C_4$ alkyl ester and/or $C_1$-$C_{18}$, more preferably $C_1$-$C_{12}$, most preferably $C_1$-$C_4$ hydroxy alkyl ester of ethylenically unsaturated carboxylic acid. Examples of the ester of the ethylenically unsaturated acid are methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, otctyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate(HEMA), stearyl methacrylate, stearyl acrylate, isobornyl acrylate, isobornyl methacrylate, hydroxypropyl methacrylate and vinyl acetate; more preferably is methyl methacrylate, methyl acrylate, ethyl methacrylate, ethyl acrylate, propyl acrylate, propyl methacrylate, butyl acrylate, butyl methacrylate, isobutyl acrylate, and/or isobutyl methacrylate, most preferably is methyl methacrylate and/or methyl acrylate.

The epoxy compound of the ethylenically unsaturated acid which doesn't impair the compatibility with the polybutylene terephthalate resin is preferably used. The epoxy compound of the ethylenically unsaturated acid could be carboxylic acid glycidyl ester, glycidyl ether, and/or the like. Examples of the epoxy compound of the ethylenically unsaturated acid are glycidyl acrylate, glycidyl methacrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, diglycidyl ester of butenetricarboxylic acid, triglycidyl ester of butenetricarboxylic acid, vinyl glycidyl ether, allyl glycidyl ether, 2-methylallyl glycidyl ether, phenyl glycidyl ether and 4-vinylbenzyl glycidyl ether, more preferably is glycidyl acrylate and/or glycidyl methacrylate.

The amide of the ethylenically unsaturated acid which doesn't impair the compatibility with the polybutylene terephthalate resin is preferably used. Examples of the amide of the ethylenically unsaturated acid are allylamine, aminoethyl methacrylate, aminopropyl methacrylate, dimethylaminoethyl methacrylate, acrylamide, methacrylamide, maleic acid monoamide, maleic acid diamide, maleic acid N-monoethylamide, maleic acid N,N-diethylamide, fumaric acid monoamide and/or fumaric acid diamide.

The imide of the ethylenically unsaturated acid is preferably selected from the group consisting of maleimide, N-butylmaleimide, N-phenylmaleimide and N-cyclohexylmaleimide.

The melt salt of the ethylenically unsaturated acid is preferably selected from the group consisting of sodium acrylate, calcium acrylate, sodium methacrylate and calcium methacrylate.

The conjugated diene monomer (b3) is preferably selected from the group consisting of 1,3-butadiene, 2,3-dimethyl-1,3-butadiene, 2-ethyl-1,3-butadiene, 2-methyl-1,3-pentadiene, 1,3-pentadiene, isoprene, 1,3-hexadiene, 4,5-diethyl-1,3-octadiene and 3-butyl-1,3-octadiene, more preferably is 1,3-butadiene, 1,3-pentadiene and/or isoprene, most preferably is 1,3-butadiene and/or isoprene.

In the present invention, it is not limited in the polymerization method of the vinyl aromatic-based polymer(B-1), the suitable vinyl aromatic-based polymer (B-1) could be the liner copolymers such as block copolymers, alternating copolymers, periodic copolymers, random copolymers, and the branched copolymers such as grafted copolymers or star copolymers.

In one preferred embodiment of the present invention, the vinyl aromatic-based polymer (B-1) is constituted of the vinyl aromatic monomer (b1), and at least one selected from the group consisting of the ethylenically unsaturated monomer (b2) and the conjugated diene monomer (b3). The vinyl aromatic monomer (b1) is preferably selected from the group consisting of styrene, alpha-methylstyrene, 2-methylstyrene, 3-methylstyrene and 4-methylstyrene. The ethylenically unsaturated monomer (b2) is preferably selected from the group consisting of acrylonitrile, methacrylonitrile, (meth)acrylic acid, maleic acid, fumaric acid, citraconic acid, 2-chloroacrylic acid, 2-ethylacrylic acid, angelic acid, crotonic acid, isocrotonic acid, cinnamic acid, maleic anhydride, itaconic anhydride, citraconic anhydride, fumaric anhydride, methyl (meth)acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate and glycidyl (meth)acrylate, more preferably is meth)acrylic acid, maleic acid, fumaric acid, maleic anhydride, fumaric anhydride, methyl (meth)acrylate, ethyl methacrylate, butyl acrylate, butyl methacrylate, 2-ethylhexyl acrylate and glycidyl (meth)acrylate. The conjugated diene monomer (b3) is preferably selected from the group consisting of 1,3-butadiene, 1,3-pentadiene and isoprene.

In one preferred embodiment of the present invention, the vinyl aromatic-based polymer (B-1) is constituted of the vinyl aromatic monomer (b1) which is selected from the group consisting of styrene, alpha-methylstyrene, 2-methylstyrene, 3-methylstyrene and 4-methylstyrene, and component (i) which is selected from the group consisting of (meth)acrylic acid, maleic acid, maleic anhydride, methyl (meth)acrylate and glycidyl (meth)acrylate, and optionally component (ii) which is selected from the group consisting of 1,3-butadiene, 1,3-pentadiene, acrylonitrile and methacrylonitrile. The vinyl aromatic-based polymer (B-1) disclosed herein may be in the range from 2 to 10 wt %, based on the total weight of the polybutylene terephthalate composition.

In one preferred embodiment of the present invention, the vinyl aromatic-based polymer (B-1) could be the block, alternating, random or grafted copolymers of styrene-maleic anhydride, styrene-acrylonitrile-maleic anhydride, styrene-(meth) acrylate, styrene-methyl (meth) acrylate, styrene-glycidyl (meth)acrylate, styrene-acrylonitrile-glycidyl (meth)acrylate, styrene-acrylic acid, styrene-acrylic acid-α-methylstyrene, styrene-butadiene, styrene-acrylonitrile and styrene-butadiene-acrylonitrile.

The polybutylene terephthalate composition preferably comprises up to 40 wt % of vinyl aromatic-based polymer (B-1) based on the total weight of the polybutylene terephthalate composition. For example, the vinyl aromatic-based polymer (B-1) disclosed herein may be in the range from 0.1 to 30 wt %, 0.3 to 20 wt %, 2 to 10 wt %, based on the total weight of the polybutylene terephthalate composition.

The weight-average molecular weight (Mw) of vinyl aromatic-based polymer (B-1) is generally in the range from 1,000 to 15,000 g/mol, preferably from 2,000 to 10,000 g/mol, measured by means of GPC, tetrahydrofuran as eluent.

The vinyl aromatic-based polymer (B-2)

The vinyl aromatic-based polymer (B-2) is a core-shell polymer comprising a core and a shell, the core is derived from a first monomer system comprising at least one vinyl aromatic monomer (b1), and optionally at least one selected from the group consisting of ethylenically unsaturated monomer (b2) and conjugated diene monomer (b3); the shell is derived from a second monomer system comprising at least one monomer selected from the group consisting of vinyl aromatic monomer (b1) and ethylenically unsaturated monomer (b2); the weight ratio of the core to the shell in the core-shell polymer is 90:10 to 10:90.

The ethylenically unsaturated monomer (b2) in the vinyl aromatic-based polymer (B-2) is preferably ethylenically unsaturated nitrile monomer, ethylenically unsaturated acid monomer and derivative thereof. The derivative of the ethylenically unsaturated acid preferably is acid anhydride, ester, melt salt, amide, imide and/or epoxy compound of the ethylenically unsaturated acid, more preferably is acid anhydride and/or ester of the ethylenically unsaturated acid.

In one preferred embodiment of the present invention, the ethylenically unsaturated monomer (b2) in the vinyl aromatic-based polymer (B-2) is ethylenically unsaturated nitrile monomer, ethylenically unsaturated acid monomer, acid anhydride of ethylenically unsaturated acid monomer and/or ester of ethylenically unsaturated acid monomer.

The core of the core-shell polymer is the polymer or the copolymer which is derived from the first monomer system. The emulsion polymerization of the first monomer system is desirably to prepare the core.

Suitable vinyl aromatic monomers (b1) in the core or shell could be same or different, which include monomers corresponding to the Formula I:

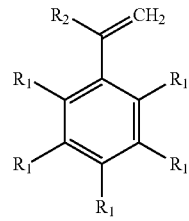

Formula I wherein $R_1$ is same or different and is selected from the group consisting of hydrogen, $C_1$-$C_{10}$ alkyl group, $C_1$-$C_6$ alkenyl group, $C_4$-$C_{10}$ cycloaliphatic, $C_6$-$C_{12}$ aromatic hydrocarbon group, $C_1$-$C_4$ alkoxy group and halogen atoms, preferably is hydrogen, $C_1$-$C_{10}$ alkyl group and halogen atoms, more preferably is hydrogen and/or $C_1$-$C_4$ alkyl group, most preferably is hydrogen, methyl group and/or ethyl group; $R_2$ is hydrogen and/or $C_1$-$C_4$ alkyl group, preferably is hydrogen, methyl group and/or ethyl group.

Examples of the vinyl aromatic monomers are styrene, alpha-methylstyrene, 2-methylstyrene, 3-methylstyrene, 4-methylstyrene, 2,4-dimethylstyrene, 2,5-dimethylstyrene, para-alpha-dimethylstyrene, 2-ethylstyrene, 3-ethylstyrene, 4-ethyl styrene, 2-isopropyl styrene, 3-isopropyl styrene, 4-isopropyl styrene, ortho-divinylbenzene, meta-divinylbenzene, para-divinylbenzene, ethoxy styrene, chlorostyrene, bromostyrene, dibromostyrene, dichlorostyrene, tribromostyrene, trichlorostyrene, 2-vinylnaphthalene and 2-isopropenylnaphthalene, preferably is styrene, alpha-methylstyrene, 4-methylstyrene, chlorostyrene, para-divinylbenzene, bromostyrene, dibromostyrene, trichlorostyrene, 2-vinylnaphthalene and/or 2-isopropenylnaphthalene, more preferably is styrene, alpha-methylstyrene and/or 4-methylstyrene.

The conjugated diene monomer (b3) is preferably selected from the group consisting of 1,3-butadiene, 2,3-dimethyl-1,3-butadiene, 2-ethyl-1,3-butadiene, 2-methyl-1,3-pentadiene, 1,3-pentadiene, isoprene, 1,3-hexadiene, 4,5-diethyl-1,3-octadiene and 3-butyl-1,3-octadiene, more preferably is 1,3-butadiene, 1,3-pentadiene and/or isoprene, most preferably is 1,3-butadiene and/or isoprene.

The ethylenically unsaturated nitrile monomer of the core or the shell is preferably selected from the group consisting of acrylonitrile, methacrylonitrile, fumaronitrile and/or α-cyanoethylacrylonitrile, more preferably is acrylonitrile and/or methacrylonitrile, most preferably is acrylonitrile.

The ethylenically unsaturated acid monomer of the core or the shell has at least one carbon-carbon double bond and one acid group, such as carboxyl or sulfonic group, preferable is ethylenically unsaturated carboxylic acid monomer, such as mono-olefinic and polyolefinic unsaturated mono-, and poly-carboxylic acid (di-, tri-carboxylic acid). Examples of the ethylenically unsaturated carboxylic acid monomer are $C_3$-$C_6$ ethylenically unsaturated carboxylic acid, preferably is selected from the group consisting of acrylic acid, methacrylic acid, 2-ethylacrylic acid, angelic acid, crotonic acid, isocrotonic acid, sorbic acid, maleic acid, fumaric acid, itaconic acid, citraconic acid, mesaconic acid, glutaconic acid and aconitic acid, more preferably is acrylic acid, methacrylic acid and/or itaconic acid.

Examples of the acid anhydride monomer of the ethylenically unsaturated acid of the core or the shell are maleic anhydride (MAH), acrylic anhydride, methacrylic anhydride, itaconic anhydride, citraconic anhydride, butenedioic anhydride and/or fumaric anhydride, more preferably is acrylic anhydride, methacrylic anhydride, itaconic anhydride and/or butenedioic anhydride.

The ester monomer of the ethylenically unsaturated acid of the core or the shell is preferably an alkyl ester and/or a hydroxy alkyl ester of the ethylenically unsaturated acid, such as C1-C18, more preferably C1-C12, most preferably C1-C4 alkyl ester and/or C1-C18, more preferably C1-C12, most preferably C1-C4 hydroxy alkyl ester of ethylenically unsaturated carboxylic acid. Examples of the ester of the ethylenically unsaturated acid are methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, otctyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate (HEMA), stearyl methacrylate, stearyl acrylate, isobornyl acrylate, isobornyl methacrylate, hydroxypropyl methacrylate and/or vinyl acetate, more preferably is methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, decyl acrylate, lauryl methacrylate, stearyl methacrylate, stearyl acrylate and/or vinyl acetate, most preferably is methyl methacrylate, methyl acrylate, ethyl methacrylate, ethyl acrylate, butyl methacrylate, propyl methacrylate, 2-ethylhexyl acrylate, lauryl methacrylate, stearyl methacrylate, stearyl acrylate and/or decyl acrylate.

The examples of the epoxy compound, amide, imide and melt salt of the ethylenically unsaturated acid of the core or the shell in the vinyl aromatic-based polymer (B-2) could be the same as those in the vinyl aromatic-based polymer (B-1).

In one preferred embodiment of the present invention, the core of the core-shell polymer comprises units derived from at least one vinyl aromatic monomer (b1), and at least one conjugated diene monomer (b3). The vinyl aromatic monomer (b1) is preferably styrene, alpha-methylstyrene and/or 4-methylstyrene; and the conjugated diene monomer (b3) is preferably 1,3-butadiene, 1,3-pentadiene and/or isoprene. The core of the core-shell polymer is preferably the diblock polymer of 1,3-diene and styrene (e.g., butadiene-styrene copolymer, isoprene-styrene copolymer).

In one preferred embodiment of the present invention, the core of the core-shell polymer comprises units derived from at least one vinyl aromatic monomer (b1), at least one conjugated diene monomer (b3), and at least one monomer selected from the group consisting of ethylenically unsaturated nitrile, and $C_1$-$C_4$ alkyl ester of ethylenically unsaturated acid. The ethylenically unsaturated nitrile is preferably acrylonitrile and/or methacrylonitrile; the $C_1$-$C_4$ alkyl ester of ethylenically unsaturated acid is preferably methyl (meth)acrylate, ethyl (meth)acrylate, propyl (meth)acrylate, butyl (meth)acrylate, and/or isobutyl (meth)acrylate. The core of the core-shell polymer is preferably butadiene-styrene-(meth)acrylate terpolymer, butadiene-styrene-acrylonitrile terpolymer.

In one preferred embodiment of the present invention, the core of the core-shell polymer comprise units derived from at least one vinyl aromatic monomer (b1), and at least one monomer selected from the group consisting of $C_1$-$C_4$ alkyl ester of ethylenically unsaturated acid, ethylenically unsaturated acid, and ethylenically unsaturated nitrile. The $C_1$-$C_4$ alkyl ester of ethylenically unsaturated acid is preferably methyl (meth)acrylate, ethyl (meth)acrylate, propyl (meth)acrylate, butyl (meth)acrylate and/or isobutyl (meth)acrylate; the ethylenically unsaturated acid is preferably acrylic acid, methacrylic acid and/or itaconic acid; the ethylenically unsaturated nitrile is preferably acrylonitrile and/or methacrylonitrile.

In one preferred embodiment of the present invention, the core comprises from 5 wt % to 80 wt %, preferably from 15 wt % to 35 wt % of units derived from at least one vinyl aromatic monomer (b1), based on the total units of the core.

In one preferred embodiment of the present invention, the core comprises from 5 wt % to 80 wt %, preferably from 15 wt % to 35 wt % of units derived from at least one vinyl aromatic monomer (b1) and from 20 wt % to 95 wt %, preferably from 65 wt % to 85 wt % of units derived from at least one conjugated diene monomer (b3) (preferably 1,3-diene), based on the total units of the core.

In one preferred embodiment of the present invention, the shell of the core-shell polymer comprises units derived from at least one ester of the ethylenically unsaturated acid and/or at least one vinyl aromatic monomer (b1). The ester of the ethylenically unsaturated acid is preferably C1-C4 alkyl ester and/or C1-C4 hydroxy alkyl ester of (meth)acrylic acid or acetic acid, more preferably is methyl methacrylate, methyl acrylate, ethyl methacrylate, ethyl acrylate, propyl acrylate, propyl methacrylate, butyl acrylate, butyl methacrylate, isobutyl acrylate and/or isobutyl methacrylate, more preferably is methyl methacrylate, methyl acrylate, propyl methacrylate and/or butyl methacrylate. The vinyl aromatic monomer (b1) is preferably styrene, alpha-methylstyrene, 4-methylstyrene, chlorostyrene, bromostyrene, dibromostyrene, dichlorostyrene and/or tribromostyrene, more preferably is styrene, alpha-methylstyrene and/or 4-methylstyrene.

In one preferred embodiment of the present invention, the shell of the core-shell polymer comprises units derived from at least one selected from the group consisting of $C_1$-$C_4$ alkyl ester of the ethylenically unsaturated acid and vinyl aromatic monomer (b1), and one monomer (iii) selected from the group consisting of ethylenically unsaturated nitrile monomer, ethylenically unsaturated acid monomer, acid anhydride and/or $C_{10}$-$C_{20}$ alkyl ester of the ethylenically unsaturated acid. The $C_1$-$C_4$ alkyl ester of the ethylenically unsaturated acid is preferably methyl methacrylate, methyl acrylate, ethyl methacrylate, ethyl acrylate, propyl acrylate, propyl methacrylate, butyl acrylate, butyl methacrylate, isobutyl acrylate and/or isobutyl methacrylate, more preferably is methyl methacrylate, methyl acrylate, propyl methacrylate and/or butyl methacrylate. The vinyl aromatic monomer (b1) is preferably styrene, alpha-methylstyrene, 4-methylstyrene, chlorostyrene, bromostyrene, dibromostyrene, dichlorostyrene and/or tribromostyrene, more preferably is styrene, alpha-methylstyrene and/or 4-methylstyrene. Examples of monomer (iii) are acrylonitrile, methacrylonitrile, 2-ethylhexyl acrylate, decyl acrylate, lauryl methacrylate, stearyl methacrylate and/or stearyl acrylate.

In one preferred embodiment of the present invention, the core comprises units derived from at least one vinyl aromatic monomer (b1) and at least a conjugated diene monomer (b3); the shell comprises units derived from C1-C4 alkyl ester and/or C1-C4 hydroxy alkyl ester of (meth) acrylic acid or acetic acid. The vinyl aromatic monomer is preferably styrene, alpha-methylstyrene and/or 4-methylstyrene; the conjugated diene monomer is preferably 1,3-butadiene, 1,3-pentadiene and/or isoprene; the C1-C4 alkyl ester and/or C1-C4 hydroxy alkyl ester of (meth)acrylic acid or acetic acid is preferably methyl methacrylate, methyl acrylate, ethyl methacrylate, ethyl acrylate, propyl acrylate, propyl methacrylate, butyl acrylate, butyl methacrylate, isobutyl acrylate and/or isobutyl methacrylate, more preferably is methyl methacrylate, methyl acrylate, propyl methacrylate and/or butyl methacrylate.

The weight ratio of the core to the shell in the core-shell polymer is 90:10 to 10:90, preferably is 90:10 to 50:50, more preferably 90:10 to 70:30, most preferably is 90:10 to 80:20.

The core-shell polymer could also include one inner graft stage comprising units derived from graft-linking monomers comprising at least one vinyl aromatic monomer, and/or at least one $C_1$-$C_4$ alkyl ester of (meth)acrylic acid monomer; and optional one intermediate sealer stage comprising at least one of the following monomers: a $C_1$-$C_8$ alkyl acrylate or a polyunsaturated crosslinker, the intermediate sealer stage is between the inner graft stage and the shell.

The vinyl aromatic monomer in the inner graft stage is preferably styrene, alpha-methylstyrene, 2-methylstyrene, 3-methylstyrene, 4-methylstyrene, 2,4-dimethylstyrene, 2,5-dimethylstyrene, para-alpha-dimethylstyrene, 2-ethylstyrene, 3-ethylstyrene, 4-ethyl styrene, 2-isopropyl styrene, 3-isopropyl styrene, 4-isopropyl styrene, ortho-divinylbenzene, meta-divinylbenzene, para-divinylbenzene, ethoxy styrene, chlorostyrene, bromostyrene, dibromostyrene, dichlorostyrene, tribromostyrene, trichlorostyrene, 2-vinyl naphthalene and/or 2-isopropenylnaphthalene, preferably is styrene, alpha-methylstyrene and/or 4-methylstyrene.

The $C_1$-$C_4$ alkyl ester of (meth)acrylic acid monomer is preferably methyl methacrylate, methyl acrylate, ethyl methacrylate, ethyl acrylate, propyl acrylate, propyl methacrylate, butyl acrylate, butyl methacrylate, acrylate, isobutyl acrylate and/or isobutyl methacrylate, more preferably is methyl methacrylate, methyl acrylate, ethyl methacrylate, butyl methacrylate and/or propyl methacrylate.

The inner graft stage could also comprise units derived from one or more of any of the following monomers: acrylonitrile, methacrylonitrile, 2-ethylhexyl acrylate, decyl acrylate, vinyl naphthalene, isopropenyl naphthalene, as well as higher carbon ($C_{12}$-$C_{20}$) alkyl methacrylates and acrylates such as lauryl methacrylate, lauryl acrylate, stearyl methacrylate, stearyl acrylate and isobornyl methacrylate.

The suitable $C_1$-$C_8$ alkyl acrylate includes methyl methacrylate, methacrylate, methyl acrylate, ethyl methacrylate, ethyl acrylate, propyl acrylate, propyl methacrylate, butyl acrylate, butyl methacrylate, 2-ethylhexyl acrylate and octyl acrylate, more preferably is butyl acrylate.

The suitably polyunsaturated crosslinker include butylene glycol dimethacrylate, alkanepolyol polyacrylates or polymethacrylates such as ethylene glycol diacrylate, ethylene glycol dimethacrylate, butylene glycol diacrylate, oligoethylene glycol diacrylate, oligoethylene glycol dimethacrylate, trimethylolpropane diacrylate, trimethylolpropane dimethacrylate, trimethylolpropane triacrylate or trimethylolpropane trimethacrylate, and unsaturated carboxylic acid allyl esters such as allyl acrylate, allyl methacrylate and diallyl maleate, and preferably is divinyl benzene.

In one preferred embodiment, the core-shell polymer comprising: from 70 to 85 weight parts of the core; from 8 to 14 weight parts of the inner graft stage; from 0.1 to 5 weight parts of an intermediate sealer stage; and from 10 to 16 weight parts of the shell. The core preferably comprises from 15 wt % to 35 wt % of units derived from at least one vinyl aromatic monomer (b1), and from 65 wt % to 85 wt % of units derived from at least one conjugated diene monomer (b3), based on the total units of the core.

The core of the core-shell polymer preferably has a weight-average molecular weight greater than about 8,000 as determined by gel permeation chromatography, more preferably greater than 50,000.

The shell of the core-shell polymer preferably has a weight-average molecular weight of about 5,000 to about 100,000 as determined by gel permeation chromatography, more preferably about 10,000 to about 80,000.

The core-shell polymer may be any one or more of the core-shell polymers mentioned in EP1514883A1, EP0985692A1 and EP0348565A1, the contents of each of which are incorporated herein by reference.

The core-shell polymer in the present invention could be prepared via the conventionally polymerization method, such as the methods mentioned in the EP0348565A1 or EP1514883A1.

The preparation method of the core-shell polymer comprising emulsion polymerizing a first monomer system to form the core, then emulsion polymerizing, in the presence of the core, a second monomer system to form the shell; or comprising emulsion polymerizing a second monomer system to form the shell, then emulsion polymerizing, in the presence of the shell, a first monomer system to form the core.

In one preferred embodiment, the preparation method of the core-shell polymer could be any one of I to III as following:
  I. In the presence of the graft-linking monomers, emulsion polymerization of the core; emulsion polymerization of the shell and grafting the shell to the core.
  II. The core is emulsion polymerized; adding the graft-linking monomers and soaking into the core, polymerized the graft-linking monomers; the shell is emulsion polymerized in the presence of the core and chemically grafted thereto.
  III. In the presence of the graft-linking monomers, emulsion polymerization of the shell; emulsion polymerization of the core and grafting of the core to the shell.

In one preferred embodiment, the preparation method of the core-shell polymer comprises:
i. polymerizing in emulsion, a first monomer system, comprising from 65 wt % to 85 wt % of the diolefin monomer, and from 15 wt % to 35 wt % of the vinyl aromatic monomer in the presence of an emulsifier and a free-radical initiator, until 60%-90% conversion of the monomers to polymer has been achieved;
ii. continuing the polymerization of the first monomer system while adding the graft-linking monomers which comprises at least one vinyl aromatic monomer, and/or at least one $C_1$-$C_4$ alkyl ester of (meth)acrylic acid monomer;
iii. continuing the polymerization of the graft-linking monomers to at least 90% conversion to polymer has been achieved; and
iv. adding a second monomer system, which comprises at least one $C_1$-$C_4$ alkyl ester of the ethylenically unsaturated acid and/or at least one vinyl aromatic monomer, adding a free-radical initiator, and continuing the polymerization until at least 95% conversion of the monomer to polymer has been achieved; wherein the reaction temperature during steps (i) through (iv) is in the range of from 20° C. to 100° C., preferably from 60° C. to 70° C.

After the step (iii), preferably adding at least one $C_1$-$C_8$ alkyl acrylate or at least one polyunsaturated crosslinker, and a free-radical initiator.

The free-radical initiators which may be used in the various steps of the process are those conventionally utilized in free-radical polymerizations conducted in the temperature range from about room temperature to about 100° C.; preferably from 55° C. to 80° C. Suitable initiators include thermally-activated initiators, such as persulfates, peroxides, or peroxyesters. Suitable initiators also include "redox" initiators, such as oxidants such as hydroperoxides, persulfates, or peroxides, in combination with reductants such as sodium formaldehyde sulfoxylate, sodium sulfite, sodium hydrosulfite, or isoascorbic acid. An oil-soluble initiator having a water solubility less than styrene (3.5 mM at 25° C.-50° C.), is preferred, examples of which include diisopropylbenzene hydroperoxide, t-butyl perbenxoate, tert-butylperoxy isopropylcarbonate, t-butyl peroxyisobutyrate, t-butyl peroctoate, diisopropyl peroxy dicarbonate, di(2-ethylhexyl)peroxy dicarbonate, and the like. Redox reactions may also be promoted by reagents such as iron salts, for example ferrous iron-ethylene-diamine tetraacetic acid ("Fe-EDTA").

The polybutylene terephthalate composition preferably comprises from 1 to 20 wt %, more preferably from 2 to 15 wt %, most preferably 2 to 10 wt % of vinyl aromatic-based polymer(B-2), based on the total weight of the polybutylene terephthalate composition.

The polybutylene terephthalate composition comprising the vinyl aromatic-based polymer (B-2) shows better bonding strength and dielectric loss, which has more applications.

Reinforcement Agent (C)

The reinforcement agent according to the present invention could be chosen any reinforcement agent within the range not impairing the effects of the present invention.

Example of the reinforcement agent could be glass fibers, carbon fibers, metal fibers, aramid fibers, whiskers (whisker), talc, mica, clay and a mixture thereof.

The present invention is not limited in diameter, shape such as cylinder and cocoon, length and glass cutting method such as chopped strand and roving of the glass fiber. Further, the present invention is not limited in type of glass, such as E-glass fiber, D-glass fiber, S-glass fiber, C-glass fiber, T-glass fiber, and E-glass fiber or corrosion-resistant glass containing zirconium is preferably used in the view of quality. There is no limitation of the kind of glass fibers, conventional E-glass fiber could fulfil the requirement of low dielectric loss. D-glass fiber with dielectric constant less or equal to 5.0 is also preferably.

The reinforcement agent is used at a content of 5 wt % to 40 wt % based on the total weight of the polybutylene terephthalate composition, preferably from 5 wt % to 35 wt %, more preferably from 15 wt % to 30 wt %.

Low Melting Point Polyester (D)

The polybutylene terephthalate composition of the present invention may further comprise as component (D) polyester copolymer with melting point ($T_m$) from 105° C. to 185° C., preferably from 110° C. to 160° C.

The polyester copolymer with melting point (Tm) from 105° C. to 185° C. in the invention (hereinafter, simply referred to as "the polyester copolymer") is also called as "low melting point polyester", which has lower melting point than the unmodified polyester. The melting point is measured by differential scanning calorimetry ("DSC") according to ISO11357 with a heating rate of 10° C./min. The polyester copolymer can be obtainable by partial substitution of a second dicarboxylic acid component and/or a second glycol component constituting polyethylene terephthalate and/or polybutylene terephthalate with a copolymerizable monomer, in which the second dicarboxylic acid component comprising at least a terephthalic acid and/or the ester derivative thereof, the second glycol component comprising at least one 1,4-butane diol, ethylene glycol and/or the ester derivative of 1,4-butane diol and ethylene glycol, preferably is ethylene glycol and/or the ester derivative thereof.

The copolymerizable monomer includes one or more monomers selected from a third dicarboxylic acid excluding terephthalic acid, and/or a third glycol excluding ethylene glycol and 1,4-butane diol.

The ratio of dicarboxylic acid (the second dicarboxylic acid and the third carboxylic acid) to the glycol (the second glycol and the third glycol) is 0.9:1.1 to 1.1:0.9.

The third dicarboxylic acid could be at least one selected from the group consisting of an aliphatic dicarboxylic acid, a cycloaliphatic dicarboxylic acid, and/or an aromatic dicarboxylic acid excluding terephthalic acid and their reactive derivatives.

The aliphatic dicarboxylic acid disclosed herein is preferably dicarboxylic acid comprising from 4 to 40 carbon atoms, more preferably from 4 to 24 carbon atoms, from 4 to 14 carbon atoms, or from 4 to 10 carbon atoms. For example, the aliphatic dicarboxylic acid disclosed herein could be succinic acid, glutaric acid, adipic acid, pimelic acid, suberic acid, azelaic acid, sebacic acid, undecane dicarboxylic acid, dodecane dicarboxylic acid, tridecane dicarboxylic acid, tetradecane dicarboxylic acid, pentadecane dicarboxylic and/or hexadecane dicarboxylic acid, preferably is succinic acid, glutaric acid, azelaic acid, adipic acid, pimelic acid and/or sebacic acid.

The cycloaliphatic dicarboxylic acid preferably comprises from 7 to 12 carbon atoms. For example, the alicyclic dicarboxylic acid disclosed herein could be hexahydrophthalic acid, hexahydroisophthalic acid, hexahydroterephthalic acid, 1,2-cyclopentanedicarboxylic acid, 1,3-cyclopentanedicarboxylic acid and/or himic acid.

The suitable aromatic dicarboxylic acid excluding terephthalic acid preferably comprises from 8 to 16 carbon atoms, more preferably is at least one selected from the group consisting of isophthalic acid, phthalic acid, 2,6-naphthalenedicarboxylic acid, 1,4-naphthalenedicarboxylic acid, 2,7-naphthalenedicarboxylic acid, 4,4'-diphenylmethanedicarboxylic acid, 4,4'-diphenylketone dicarboxylic acid, 4,4'-diphenyldicarboxylic acid, 4,4'-diphenoxy ether dicarboxylic acid, 4,4'-diphenyl ether dicarboxylic acid, a $C_1$-$C_4$ alkyl ester of phthalic acid or isophthalic acid(such as dimethyl phthalic acid or dimethyl isophthalic acid (DMI)), and a derivative such as an acid chloride or and acid anhydride which can form the ester, preferably is isophthalic acid and/or phthalic acid.

The third glycol could be at least one selected from the group consisting of an aliphatic alkane diol excluding ethylene glycol or 1,4-butane diol, polyoxyalkylene glycol, cycloaliphatic glycol, and aromatic diol.

The aliphatic alkane diol disclosed herein is preferably aliphatic alkane diol comprising from 2 to 12, more preferably from 2 to 10, furthermore preferably from 2 to 6 carbon atoms, for example, trimethylene glycol, propylene glycol, neopentyl glycol, hexane diol, octane diol and/or decane diol.

The polyoxyalkylene glycol disclosed herein is preferably a glycol having a plurality of oxyalkylene units of which the carbon atom number is 2 to 4, more preferably is at least one selected from the group consisting of diethylene glycol, dipropylene glycol, ditetramethylene glycol, triethylene glycol, tripropylene glycol, and polytetramethylene glycol.

The cycloaliphatic glycol disclosed herein preferably comprises from 6 to 12 carbon atoms, more preferably is 1,4-cyclohexanediol and/or 1,4-cyclohexane dimethanol.

The aromatic glycol disclosed herein is preferably aromatic diol comprising from 6 to 14 carbon atoms, more preferably is at least one selected from the group consisting of xylylene glycol, hydroquinone, resorcinol, naphthalene diol, biphenyl, bisphenol and xylilene glycol.

In the preferred embodiment of the invention, the third glycol is the aliphatic alkane diol having from 2 to 6 carbon atoms such as trimethylene glycol, propylene glycol and/or hexane diol, and/or polyoxyalkylene glycol having an oxyalkylene unit at a repeat number of about 2 to 4 such as diethylene glycol.

In the preferred embodiment of the invention, the third dicarboxylic acid is aliphatic dicarboxylic acid having 6 to 12 carbon atoms such as adipic acid, pimelic acid, suberic acid, azelaic acid or sebacic acid, and/or aromatic dicarboxylic acid such as isophthalic acid and/or phthalic acid.

In the preferred embodiment of the invention, the third glycol could be the polyoxyalkylene glycol having an oxyalkylene unit at a repeat number of about 2 to 4 such as diethylene glycol, and the third dicarboxylic acid could be aromatic dicarboxylic acid such as isophthalic acid and/or phthalic acid.

In one preferred embodiment, the polyester copolymer could comprise 5% to 30%, preferably 5% to 20% by mole of copolymerizable monomers, based on the total moles of the monomers constituting the polyester copolymer.

In one preferred embodiment, the polyester copolymer comprises 1% to 10% by mole of the third glycol such as the polyoxyalkylene glycol and 4% to 29% by mole of the third dicarboxylic acid such as aromatic dicarboxylic acid, especially isophthalic acid and/or phthalic acid, based on the total moles of the monomers constituting the polyester copolymer.

In one preferred embodiment, the polyester copolymer is constituted from terephthalic acid, ethylene glycol, polyoxyalkylene glycol having 2 to 4 oxyalkylene units of which the carbon atom number is 2 to 4 such as diethylene glycol as the third glycol, and aromatic dicarboxylic acid having from 8 to 16 carbon atoms such as isophthalic acid and/or phthalic acid as the third carboxylic acid. Preferably, the amount of the third glycol is from 1 mol % to 10 mol %, the amount of the third dicarboxylic acid is from 1 mol % to 10 mol %, based on the total moles of the monomers constituting the polyester copolymer, the ratio of dicarboxylic acid (terephthalic acid and the third carboxylic acid) to the glycol (ethylene glycol and the third glycol) is 0.9:1.1 to 1.1:0.9.

In one preferred embodiment, the polyester copolymer could comprise 5% to 30%, preferably 5% to 20% by mole of copolymerizable monomers, based on the total moles of the monomers constituting the polyester copolymer.

In one preferred embodiment, the polyester copolymer comprises 1% to 10% by mole of the third glycol such as the polyoxyalkylene glycol and 4% to 29% by mole of the third dicarboxylic acid such as aromatic dicarboxylic acid, especially isophthalic acid and/or phthalic acid.

The polybutylene terephthalate composition preferably comprises 0 wt % to 40 wt % of the polyester copolymer based on the total weight of polybutylene terephthalate composition. For example, the polyester copolymer disclosed herein may be in the range from 10 wt % to 35 wt %, 10 wt % to 30 wt %, 15 wt % to 35 wt %, 15 wt % to 30 wt % based on the total weight of the polybutylene terephthalate composition.

The low melting point polyester preferably has a weight-average molecular weight of 8,000 to 80,000 g/mol, preferably from 10,000 to 30,000 g/mol, measured by means of as determined by gel permeation chromatography.

Glass Bubbles (E)

The polybutylene terephthalate composition of the present invention may further comprise as component (E) glass bubbles.

The glass bubbles in the invention is also called as "hollow glass bubbles", "hollow glass microspheres", "hollow glass beads", "glass microbubbles" or "glass balloons", having an average diameter of less than about 500 micrometers, and comprising a hollow part and a glass shell surrounding the hollow part. The hollow part could be filled with gas, such as air.

The average diameter is preferably median diameter $D_{50}$ by volume. The median diameter $D_{50}$ by volume of the hollow glass bubbles is preferably ranging from 5 to 50 microns.

The average true density of the glass bubbles in the invention is preferably 0.3-0.7 g/cc, more preferably is 0.3-0.6 g/cc. For example, the average true density of the glass bubbles disclosed herein may be in the range from 0.32 g/cc to 0.6 g/cc, 0.35 g/cc to 0.6 g/cc, 0.38 g/cc to 0.6 g/cc, 0.43 g/cc to 0.6 g/cc, 0.45 g/cc to 0.6 g/cc, 0.46 g/cc to 0.6 g/cc, 0.49 g/cc to 0.6 g/cc, 0.30 g/cc to 0.55 g/cc, 0.32 g/cc to 0.55 g/cc, 0.35 g/cc to 0.55 g/cc, 0.38 g/cc to 0.55 g/cc, 0.43 g/cc to 0.55 g/cc, 0.45 g/cc to 0.55 g/cc, 0.46 g/cc to 0.55 g/cc, 0.49 g/cc to 0.55 g/cc, 0.30 g/cc to 0.5 g/cc, 0.32 g/cc to 0.5 g/cc, 0.35 g/cc to 0.5 g/cc, 0.38 g/cc to 0.5 g/cc, 0.40 g/cc to 0.5 g/cc, 0.43 g/cc to 0.5 g/cc, 0.45 g/cc to 0.5 g/cc, 0.46 g/cc to 0.5 g/cc, 0.43 g/cc to 0.49 g/cc. The average true density of the glass bubbles is the quotient obtained by dividing the mass of a sample of glass bubbles by the true volume of that mass of glass bubbles as measured by a gas pycnometer. The "true volume" is the aggregate total volume of the glass bubbles, not bulk volume. The average true density can be measured using a pycnometer according to ASTM D2840-69 "Average True Particle Density of Hollow Microspheres". "g/cc" means grams per cubic centimeter.

The crush strength of the glass bubbles is preferably 5,000 PSI to 30,000 PSI, more preferably is 6,000 PSI to 28,000 PSI. For example, the crush strength disclosed herein may be in the range from 8,000 PSI to 20,000 PSI, 10,000 PSI to 18,000 PSI, 16,000 PSI to 18,000 PSI. The crush strength of the glass bubbles is typically measured using ASTM D3102-72 "Hydrostatic Collapse Strength of Hollow Glass Microspheres".

The glass bubbles according to the present invention has a size distribution comprising a median size by volume in a range from about 8 micrometers to about 60 micrometers. The median size by volume of the glass bubbles may be, for example, in a range from 10 to 55 micrometers, 15 to 55 micrometers, 15 to 50 micrometers, 15 to 45 micrometers, 15 to 40 micrometers, 15 to 35 micrometers, 15 to 30 micrometers, 15 to 25 micrometers, 15 to 20 micrometers, 20 to 55 micrometers, 20 to 50 micrometers, 20 to 45 micrometers, 20 to 40 micrometers, 20 to 35 micrometers, 20 to 30 micrometers, 20 to 25 micrometers. In some embodiments, the glass bubbles disclosed herein have a size distributed from 5 to 30 micrometers, 10 to 35 micrometers, 10 to 50 micrometers, 15 to 60 micrometers, 20 to 38 micrometers, 20 to 45 micrometers, 20 to 70 micrometers. The median size by volume is also called the Dv50 size, wherein 50 percent by volume of the glass bubbles in the distribution are smaller than the indicated size. As used herein, the term size is considered to be equivalent with the diameter and/or height of the glass bubbles. The size distribution of glass bubbles may be Gaussian, normal, non-normal distributions. The non-normal distributions may be unimodal or multi-modal.

The glass bubbles useful in the invention herein can be obtained commercially and marketed by Potters Industries, Valley Forge, PA19482 under the trade designations "Sphericel Hollow Glass Spheres" (for example grades 110P8 and 60P18) or by 3M company under the trade designation "3M Glass bubbles", for example grades S60, S60HS, S38HS, S38XHS, iM16K, iM30K, K42HS, and K46.

The polybutylene terephthalate composition preferably comprises 0 wt % to 20 wt % of glass bubbles based on the total weight of polybutylene terephthalate composition. For example, the glass bubbles disclosed herein may be in the range from 5 wt % to 15 wt %, 5 wt % to 10 wt % based on the total weight of the polybutylene terephthalate composition.

The examples of the silane coupling agent is epoxy functional silane, urethane functional silane and/or amino ureide functional silane, preferable is at least one selected from the group consisting of epoxycyclohexyl functional silane, glycidoxy functional silane, isocyanate functional silane and amino ureide functional silane, most preferably is at least one selected from 2-(3,4-epoxycyclohexyl) ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyldimethoxysilane, N-2-(aminoethyl)-3-aminopropyltributoxysilane, N-2-(aminoethyl)-3-aminopropylmethyldiethoxysilane, N-2-(aminoethyl)-3-aminopropyltriethoxysilane, 3-aminopropyltrimethoxysilane, 3-aminopropylmethyldiethoxysilane, 3-aminopropylmethyldimethoxysilane, 3-aminopropyldimethylmethoxysilane, 3-aminopropyldimethylethoxysilane, 3-aminopropyltriethoxysilane, 3-triethoxyysily-N-(1,3 dimethyl-butylidene) propylamine, N-phenyl-3-aminopropyltrimethoxysilane, N-(vinylbenzyl)-2-aminoethyl-3-aminopropyltrimethoxysilane hydrochloride, 3-ureidopropyltrialkoxysilane and 3-isocyanatepropyltriethoxysilane.

Additives (F)

The polybutylene terephthalate composition can further comprise the other constituents being additives selected by those skilled in the art in accordance with the later use of the products, preferably from at least one of customary additives defined hereinafter, provided that said customary additives don't have negative effect on the polybutylene terephthalate composition according to the invention.

The customary additives are preferably used in an amount of 0 wt % to 10 wt %, more preferably is from 0.1 wt % to 5 wt %, most preferably is from 0.5 wt % to 3 wt %, based on the total weight of the polybutylene terephthalate composition.

Customary additives used according to the invention are preferably lubricants, stabilizers, antioxidant agents, demolding agents, UV stabilizers, thermal stabilizers, gamma ray stabilizers, antistatic agents, flow aids, flame retardants, elastomer modifiers, acid scavengers, emulsifiers, nucleating agents, plasticizers and/or pigments. These and further suitable additives are described, for example, in Gächter, Müller, Kunststoff-Additive [Plastics Additives], 3rd edition, Hanser-Verlag, Munich, Vienna, 1989 and in the Plastics Additives Handbook, 5th Edition, Hanser-Verlag, Munich, 2001. The additives can be used alone or in a mixture, or in the form of masterbatches.

In one preferred embodiment of the invention, the polybutylene terephthalate composition according to the invention may further include one or more lubricant and/or processing agent. If included, the lubricant and/or processing agent is preferably an ester or amide of saturated aliphatic carboxylic acids having from 10 to 40 carbon atoms and/or saturated aliphatic alcohols or amines having from 2 to 40 carbon atoms. A preferred lubricant is pentaerythritol tetrastearate, fatty acid ester of pentaerythritol having 10 to 20 carbon atoms.

The lubricant is preferably present in an amount of about 0 wt % to 3 wt %, more preferably of about 0.01 wt % to 2 wt %, and most preferably of about 0.2 wt % to 1 wt %, each based on the total weight of the polybutylene terephthalate composition according to the invention.

In one preferred embodiment of the invention, the polybutylene terephthalate composition according to the invention may further include one or more antioxidant agent. Antioxidant agents used are preferably aromatic amine-based antioxidant agent, hindered phenol-based antioxidant agents and phosphite-based antioxidant agents.

Examples of aromatic amine-based antioxidant agent are poly(1,2-dihydro-2,2,4-trimethyl-quinoline), bis(4-octylphenyl)amine, 4,4'-bis(α,α-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and/or N, N'-bis (methylphenyl)-1,4-benzenediamine.

Examples of hindered phenol-based antioxidant agents are poly(oxy-1,2-ethanediyl)-alpha-[3-[3,5-bis(1,1-dimethylethyl)-4-hydroxyphenyl]-1-oxopropyl]-omega-[3-[3,5-bis(1,1-dimethylethyl)-4-hydroxyphenyl]-1-oxopropoxy], 2,4-bis[(octylthio) methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester. And preferably the solid hindered phenol-based antioxidant agent is one or more selected from group "B-S" consisted of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl) propionate), triethylene glycol-bis[3-(3-tert-butyl-5-methyl-4-hydrophenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thiodiethylene bis[3-(3,5-di-tert-butyl-4-hydroxyphenyl) propionate].

Examples of phosphite-based antioxidant agents are tris (2,4-di-tert-butylphenyl) phosphite (Irgafos® 168, BASF SE, CAS 31570-04-4), bis(2,4-di-tert-butylphenyl)pentaerythrityl diphosphite (Ultranox® 626, Chemtura, CAS 26741-53-7), bis(2,6-di-tert-butyl-4-methylphenyl)pentaerythrityl diphosphite (ADK Stab PEP-36, Adeka, CAS 80693-00-1), bis(2,4-dicumylphenyl)pentaerythrityl diphosphite (Doverphos® S-9228, Dover Chemical Corporation, CAS 154862-43-8), tris(nonylphenyl) phosphite (Irgafos® TNPP, BASF SE, CAS 26523-78-4), (2,4,6-tri-t-butylphenol)-2-butyl-2-ethyl-1,3-propanediol phosphite (Ultranox® 641, Chemtura, CAS 161717-32-4) and Hostanox® P-EPQ.

The antioxidant agent is preferably present in an amount of about 0 wt % to 2 wt %, more preferably of about 0.01 wt % to 1 wt %, and most preferably of about 0.2 wt % to 0.8 wt %, each based on the total weight of the polybutylene terephthalate composition according to the invention.

In one preferred embodiment of the invention, the polybutylene terephthalate composition according to the invention may further include one or more adhesive adjuvant.

Examples of adhesive adjuvants are epoxide, such as epoxidized alkyl esters of fatty acid, such as epoxidized linseed oil, epoxidized soybean oil, epoxidized rapeseed oil and epoxy resin such as bisphenol-A resin.

The adhesive adjuvant is preferably present in an amount of about 0 wt % to 3 wt %, more preferably of about 0.01 wt % to 2 wt %, and most preferably of about 1 wt % to 2 wt %, each based on the total weight of the polybutylene terephthalate composition according to the invention.

In one preferred embodiment, the polybutylene terephthalate composition preferably comprises from 20 wt % to 50 wt %, preferably from 20 wt % to 40 wt % of polybutylene terephthalate resin(A), from 2 to 10 wt % of vinyl aromatic-based polymer (B), from 5 wt % to 40 wt %, preferably from 15 wt % to 30 wt % of reinforcement agent (C), from 0 wt % to 40 wt %, preferably from 15 wt % to 30 wt % of polyester copolymer (D), from 0 wt % to 20 wt %, preferably from 5 wt % to 15 wt % of glass bubbles (E), from 0 wt % to 10 wt %, preferably from 0.1 wt % to 5 wt % additives (F), based on the total weight of the polybutylene terephthalate composition.

In another aspect, the present invention relates to a process for preparing the polybutylene terephthalate composition according to the invention. The polybutylene terephthalate composition could be prepared or processed by various known methods, such as extruding or kneading. For example, the composition according to the present invention may be prepared or processed by (1) mixing the polybutylene terephthalate resin (A), the vinyl aromatic-based polymer (B), optional low melting point polyester (D) and optional additives (F), (2) adding the reinforcing agent (C), optional (3) adding the glass bubbles (E), and extruding or kneading. It is to be understood that the components may be introduced via different hoppers depending on the forms or properties thereof, in case that the components are introduced into the same feeding zone. The temperature of the extruder is the conventional processing temperature of the polybutylene terephthalate composition, preferably is from 200 to 270° C. The rational speed of the extruder is the conventional processing speed of the polybutylene terephthalate composition, preferably is from 200 to 500 rpm.

In another aspect, the present invention relates to a use of the vinyl aromatic-based polymer (B) in decreasing dielectric constant and dielectric loss of polybutylene terephthalate resin.

In another aspect, the present invention also relates to an article obtained or obtainable by the polybutylene terephthalate composition according to the present invention. The articles are preferably used as parts or components in E&E field, especially in high frequency communication field, such as frame, housing or package of mobiles, sensors or laptops, or antenna of mobiles or vehicles.

In another aspect, the present invention also relates to a use of the polybutylene terephthalate composition according to the present invention as materials of parts or components of frame, housing or package of mobiles, sensors or laptops, or antenna of mobiles or vehicles.

EXAMPLES

The invention will be further described by reference to the following Examples. The Examples are set forth by way of illustration and are not intended to limit the scope of the invention.

Examples 1-6 and Comparative Examples 1-6

All the components of the examples and comparative examples are listed in Table 1-5.

Component A:
 Ultradur® B 2550 from BASF (PBT with viscosity number to ISO307,1157,1628 of 107 cm³/g, number-average molar mass molecular weight (Mn) of 16500 g/mol).

Component B:
 (B-1) Joncryl® ADF 1300 from BASF, a copolymer of styrene, acrylic acid and alpha-methylstyrene with a weight-average molecular weight of $M_w$=2800 g/mol and with styrene in an amount of 90-99.5 mole %, $T_g$ of 56° C.
 (B-2) Fine-Blend™ SAG-002 from Nantong Sunny Polymer New Materials Technology Co. Ltd., a styrene-acrylonitrile-glycidyl methacrylate ternary random copolymer with styrene in an amount of 70-80 mole %.
 (B-3) SMA® 3000 from TOTAL Cray Valley Oaklands Corporate Center, poly(styrene-maleic anhydride) copolymer with ca. 3:1 mole of styrene and maleic anhydride with a weight-average molecular weight of $M_w$=9500, and number-average molecular weight $M_n$=3800.
 (B-4) Paraloid™ EXL-2655 from Dow, core-shell polymer, in which core is poly(butadiene/styrene) and shell is methyl methacrylate, with styrene in an amount of 10-30 mole %.
 (B-5) POLYLAC® ABS 757k from Chi Mei Corporation with styrene in an amount of 50-70 mole %.

Component C:
 (C-1) Glass fiber ECS3031H from Chongqing Polycomp International Corp. (CPIC)
 (C-2) Glass fiber ECS303(HL)303N-3 Chongqing Polycomp International Corp. (CPIC)

Component D:
 Low melting point polyester 180: made of terephthalic acid (TPA), isophthalic acid (IPA), ethyl glycol (EG) and diethylene glycol (DEG), molar ratio of TPA:IPA:EG:DEG=1:0.4:1.3:0.1, $T_g$=68° C., $T_m$=174° C., intrinsic viscosity=0.68dL/g.

Component E:

Glass bubble iM 16K from 3M Company.

Component F:

(F-1) Vikoflex® 7190, stabilizer from Arkema Inc.

(F-2) Irganox® 1010, antioxidant agent from BASF.

(F-3) Loxiol® P861/3.5, long-chain fatty acid ester of pentaerythritol from Emery Oleochemicals.

(F-4) MODIPER® CL430-G, compatibilizer from NOF Corporation, main chain is polycarbonate, branch polymer is poly(glycidyl methacrylate-acrylonitrile-styrene) copolymer with styrene in an amount of 1-20 mole %.

(F-5) Elvaloy® PTW, elasticizer from DuPont, ethylene terpolymer. PP Z1500, polypropylene from Dawn Group.

Components in Comparative Examples

PP Z1500 from Sinopec Yizheng Chemical fiber Co., Ltd.

PET WK851 from Zhejiang Wankai New Materials Co., Ltd., TPA based polyethylene terephthalic resin.

Characterization:

Tensile modulus, elongation at break, tensile strength at break are measured and characterized according to ISO 527-1/2 at 23° C. by using test specimens of type 1A. Charpy notched impact strength and Charpy unnotched impact strength was tested according to type A of ISO 179-1-2010 at 23° C., the sample stripe is 80*10*4 mm (length*width*thickness).

MVR: melt volume-flow rate was tested according to 1501133-2011, the test condition is 2.16 kg load at 275° C.

The dielectric constant and dielectric loss were evaluated according to IEC 60250 under 1 GHz, or GB/T 12636-90.

The bonding strength was tested according to 15019095 by using test specimens of type B.

The extruding conditions for the following examples are: the zone temperature of the screw extruder is from 200° C. to 250° C.; the throughput is 30 kg/h.

TABLE 1

| Component by wt. % | Comp. 1 | Exp. 1 | Exp. 2 |
|---|---|---|---|
| (A) | 29.85 | 29.85 | 28.85 |
| (D) | 29.85 | 29.85 | 28.85 |
| (C-2) | 20 | 20 | 20 |
| (E) | 10 | 10 | 10 |
| (B-1) | / | 1 | 3 |
| (F-1) | 1.5 | 1.5 | 1.5 |
| (F-2) | 0.3 | 0.3 | 0.3 |
| (F-3) | 0.5 | 0.5 | 0.5 |
| (F-5) | 8 | 7 | 7 |
| Dielectric Property Test, GB/T 12636-90 | | | |
| Dielectric Constant, 1 GHz | 2.8 | 2.8 | 2.7 |
| Dielectric Loss, 1 GHz | 0.011 | 0.011 | 0.009 |
| Dielectric Constant, 2 GHz | 2.8 | 2.8 | 2.7 |
| Dielectric Loss, 2 GHz | 0.011 | 0.011 | 0.009 |
| Dielectric Constant, 5 GHz | 2.8 | 2.8 | 2.7 |
| Dielectric Loss, 5 GHz | 0.01 | 0.009 | 0.009 |
| Tensile Test | | | |
| Modulus, MPa | 6192 | 6654 | Not test |
| Elongation at break, % | 3.24 | 3.3 | Not test |
| Tensile strength at break, MPa | 91 | 90 | Not test |
| Charpy Test, | | | |
| Charpy, Notched, kJ/m$^2$ | 10.1 | 9.1 | 8.2 |
| Charpy, Unnotched, kJ/m$^2$ | 69.3 | 69.2 | 57.2 |
| Melt Flow Test, | | | |
| MVR, cc/10 min | 4.6 | 12.7 | n/a |

*Comp—comparative example; Exp—example.

Seen from Table 1, the composition comprising vinyl aromatic-based polymer decrease the dielectric constant and dielectric loss, and meanwhile, the tensile modulus and flowability of the composition is increased rapidly.

TABLE 2

| Component by wt. % | Comp. 2 | Comp. 3 | Comp. 4 | Exp. 3 |
|---|---|---|---|---|
| (A) | 30.4 | 29.35 | 25.35 | 30.4 |
| (D) | 30.3 | 29.35 | 25.35 | 30.3 |
| (C-1) | 30 | 30 | 30 | 30 |
| PP Z1500 | / | 2 | 10 | / |
| (B-2) | / | / | / | 7 |
| (F-1) | 1.5 | 1.5 | 1.5 | 1.5 |
| (F-2) | 0.3 | 0.3 | 0.3 | 0.3 |
| (F-3) | 0.5 | 0.5 | 0.5 | 0.5 |
| (F-5) | 7 | 7 | 7 | / |
| Dielectric Property Test, IEC 60250 | | | | |
| Dielectric Constant, 1 GHz | 3.3 | 3.4 | 3.2 | 3.4 |
| Dielectric Loss, 1 GHz | 0.011 | 0.011 | 0.01 | 0.008 |
| Tensile Test | | | | |
| Modulus, MPa | 9730 | 8964 | 7824 | 11300 |
| Elongation at break, % | 3.4 | 3.2 | 1.7 | 3.2 |
| Tensile strength at break, MPa | 118 | 113 | 68 | 150 |
| Charpy Test | | | | |
| Charpy, Notched, kJ/m$^2$ | 13.1 | 12.7 | 10.7 | 8.3 |
| Charpy, Unnotched, kJ/m$^2$ | 75.3 | 76.3 | 27.4 | 59.4 |
| Melt Flow Test | | | | |
| MVR, cc/10 min | 6.0 | 11.8 | 17.8 | 36.8 (5 kg) |

Seen from Table 2, polypropylene is resin with low dielectric constant (2.1) and dielectric loss (0.0003), however the addition of PP has no obvious effects on the improvement of dielectric property and has obvious negative effects on the decrease on tensile property.

TABLE 3

| Component by wt. % | Comp. 5 | Exp. 4 |
|---|---|---|
| (A) | 25.35 | 26.1 |
| (D) | 25.35 | 26.1 |
| (C-1) | 30 | 30 |
| (E) | 10 | 10 |
| (B-3) | / | 1.5 |
| (F-1) | 1.5 | 1.5 |
| (F-2) | 0.3 | 0.3 |
| (F-3) | 0.5 | 0.5 |
| (F-5) | 7 | 4 |
| Dielectric Property Test, IEC 60250, 1 GHz | | |
| Dielectric Constant | 3.0 | 3.1 |
| Dielectric Loss | 0.011 | 0.009 |

TABLE 3-continued

| Component by wt. % | Comp. 5 | Exp. 4 |
|---|---|---|
| Tensile Test | | |
| Modulus, MPa | 9828 | 10280 |
| Elongation at break, % | 3.48 | 3.2 |
| Tensile strength at break, MPa | 107 | 121 |
| Charpy Test | | |
| Charpy, Notched, kJ/m$^2$ | 10.8 | 9.2 |
| Charpy, Unnotched, kJ/m$^2$ | 60.4 | 57.9 |
| Melt Flow Test | | |
| MVR, cc/10 min | 1 | 0 |

Seen from Table 3, the dielectric loss of exp.4 was decreased.

TABLE 4

| Component by wt. % | Comp. 6 | Exp. 5 |
|---|---|---|
| (A) | 30.35 | 30.35 |
| PET WK-851 | 30.35 | / |
| (B-5) | / | 30.35 |
| (C-1) | 30 | 30 |
| (F-4) | / | 7 |
| (F-1) | 1.5 | 1.5 |
| (F-2) | 0.3 | 0.3 |
| (F-3) | 0.5 | 0.5 |
| (F-5) | 7 | 1 |
| Dielectric Property Test, IEC 60250, 1 GHz | | |
| Dielectric Constant | 3.3 | 3.1 |
| Dielectric Loss | 0.012 | 0.007 |
| Tensile Test | | |
| Modulus, MPa | 8574 | 9960 |
| Elongation at break, % | 3.5 | 3.1 |
| Tensile strength at break, MPa | 107 | 133 |
| Charpy Test | | |
| Charpy, Notched, kJ/m$^2$ | 13.7 | 8.8 |
| Charpy, Unnotched, kJ/m$^2$ | 70.9 | 56.9 |
| Melt Flow Test | | |
| MVR, cc/10 min | 8.2 | 0 |

TABLE 5

| Component by wt. % | Comp. 2 | Exp. 6 |
|---|---|---|
| (A) | 30.4 | 30.35 |
| (D) | 30.3 | 30.35 |
| (C-1) | 30 | 30 |
| (B-4) | / | 7 |
| (F-1) | 1.5 | 1.5 |
| (F-2) | 0.3 | 0.3 |
| (F-3) | 0.5 | 0.5 |
| (F-5) | 7 | / |
| Dielectric Property Test, IEC 60250, 1 GHz | | |
| Dielectric Constant | 3.3 | 3.4 |
| Dielectric Loss | 0.011 | 0.009 |
| Bonding Strength Test | | |
| Bonding strength after annealing, MPa | 37.6 | 34 |
| Tensile Test | | |
| Modulus, MPa | 9730 | 8808 |
| Elongation at break, % | 3.4 | 3.15 |
| Tensile strength at break, MPa | 118 | 113 |
| Charpy Test | | |
| Charpy, Notched, kJ/m$^2$ | 13.1 | 10.4 |
| Charpy, Unnotched, kJ/m$^2$ | 75.3 | 77.4 |
| Melt Flow Test | | |
| MVR, cc/10 min | 6.0 | 14.9 |

Seen from Table 5, the core-shell vinyl aromatic polymer shows desirable effect on the decrease of dielectric loss even with quite low amount of the core-shell polymer and increase of flowability.

The invention claimed is:

1. A polybutylene terephthalate composition, comprising as component (A) at least one polybutylene terephthalate resin, as component (B) at least one vinyl aromatic-based polymer comprising units which are derived from vinyl aromatic monomers, and as component (C) at least one reinforcement agent, wherein the vinyl aromatic-based polymer is vinyl aromatic-based polymer (B-1) and/or (B-2);

wherein the vinyl aromatic-based polymer (B-1) comprises units derived from at least one vinyl aromatic monomer (b1), based on the total monomers which constitutes the vinyl aromatic-based polymer (B-1); and optionally units derived from at least one ethylenically unsaturated monomer (b2) and/or one conjugated diene monomer (b3);

wherein the vinyl aromatic monomers (b1) in the vinyl aromatic-based polymer (B-1) are present in an amount of from 60 mol % to 99.5 mol %, based on the total monomers which constitutes the vinyl aromatic-based polymer (B-1);

wherein the vinyl aromatic-based polymer (B-2) is a core-shell polymer comprising a core and a shell, the core is derived from a first monomer comprising at least one vinyl aromatic monomer (b1), and optionally at least one selected from the group consisting of ethylenically unsaturated monomer (b2) and conjugated diene monomer (b3); the shell is derived from a second monomer comprising at least one monomer selected from the group consisting of vinyl aromatic monomer (b1) and ethylenically unsaturated monomer (b2);

and wherein the weight ratio of the core to the shell in the core-shell polymer is 90:10 to 10:90, and where in the vinyl aromatic-based polymer (B-2), the core comprises from 5 wt % to 80 wt % of units derived from at least one vinyl aromatic monomer (b1) and from 20 wt % to 95wt % of units derived from at least one conjugated diene monomer (b3), based on the total units of the core.

2. The polybutylene terephthalate composition according to claim 1, wherein the vinyl aromatic monomers (b1) include monomers corresponding to Formula I:

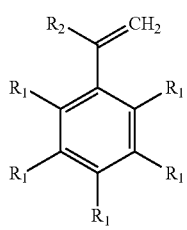

Formula I:
wherein $R_1$ is same or different and is selected from the group consisting of hydrogen, $C_1$-$C_{10}$ alkyl group, $C_1$-$C_6$ alkenyl group, $C_4$-$C_{10}$ cycloaliphatic group, $C_6$-$C_{12}$ aromatic hydrocarbon group, $C_1$-$C_4$ alkoxy group and halogen atoms; $R_2$ is hydrogen and/or $C_1$-$C_4$ alkyl group.

3. The polybutylene terephthalate composition according to claim 2, wherein the vinyl aromatic monomer (b1) is selected from the group consisting of styrene, alpha-methylstyrene, 2-methylstyrene, 3-methylstyrene, 4-methylstyrene, 2,4-dimethylstyrene, 2,5-dimethylstyrene, para-alpha-dimethylstyrene, 2-ethylstyrene, 3-ethylstyrene, 4-ethyl styrene, 2-isopropyl styrene, 3-isopropyl styrene, 4-isopropyl styrene, ortho-divinylbenzene, meta-divinylbenzene, para-divinylbenzene, ethoxy styrene, chlorostyrene, bromostyrene, dibromostyrene, dichlorostyrene, tribromostyrene, trichlorostyrene, 2-vinylnaphthalene and 2-isoprope-nylnaphthalene.

4. The polybutylene terephthalate composition according to claim 1, the ethylenically unsaturated monomer (b2) is present and is selected from the group consisting of ethylenically unsaturated nitrile monomer, ethylenically unsaturated acid monomer, and a derivative thereof; wherein the derivative of the ethylenically unsaturated acid monomer is acid anhydride, ester, melt salt, amide, imide and/or epoxy compound of the ethylenically unsaturated acid.

5. The polybutylene terephthalate composition according to claim 1, wherein the ethylenically unsaturated monomer (b2) is present,
and the ethylenically unsaturated monomer (b2) in the vinyl aromatic-based polymer (B-1) is ethylenically unsaturated nitrile monomer, ethylenically unsaturated acid monomer, acid anhydride of the ethylenically unsaturated acid, ester of the ethylenically unsaturated acid and/or epoxy compound of the ethylenically unsaturated acid;
or
the ethylenically unsaturated monomer (b2) in the vinyl aromatic-based polymer (B-2) is ethylenically unsaturated nitrile monomer, ethylenically unsaturated acid monomer, acid anhydride of the ethylenically unsaturated acid and/or ester of the ethylenically unsaturated acid.

6. The polybutylene terephthalate composition according to claim 4, wherein the ethylenically unsaturated nitrile monomer in the vinyl aromatic-based polymer (B-1) and (B-2) is independently selected from the group consisting of acrylonitrile, methacrylonitrile, fumaronitrile and/or a-cyanoethylacrylonitrile;
or
the ethylenically unsaturated acid monomer in the vinyl aromatic-based polymer (B-1) is selected from the group consisting of (meth) acrylic acid, 2-chloroacrylic acid, 2-ethylacrylic acid, angelic acid, crotonic acid, isocrotonic acid, cinnamic acid, p-chloro cinnamic acid, sorbic acid, alpha-chloro sorbic acid, alpha-cyano acrylic acid, maleic acid, fumaric acid, itaconic acid, citraconic acid, mesaconic acid, glutaconic acid, 3-(acryloyloxy) propanoic acid, 3,4,5,6-tetrahydrophthalic acid, 1,2,3,6-tetrahydrophthalic acid, bicyclo (2.2.2)-octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo (2.2.1) octa-7-ene-2,3,5,6-tetracarboxylic acid, maleopimaric acid, 7-oxabicyclo (2.2.1) hepta-5-ene-2,3-dicarboxylic acid and aconitic acid;
or
the ethylenically unsaturated acid monomer of the core or the shell in the
vinyl aromatic-based polymer (B-2) is selected from the group consisting of (meth) acrylic acid, 2-ethylacrylic acid, angelic acid, crotonic acid, isocrotonic acid, sorbic acid, maleic acid, fumaric acid, itaconic acid, citraconic acid, mesaconic acid, glutaconic acid and aconitic acid;
or
the acid anhydride of the ethylenically unsaturated carboxylic acid in the vinyl aromatic-based polymer (B-1) is selected from the group consisting of maleic anhydride, acrylic anhydride, methacrylic anhydride, 4-methyl cyclohex-4-ene-1,2-dicarboxylic acid anhydride, itaconic anhydride, citraconic anhydride, fumaric anhydride, 3,4,5,6-tetrahydrophthalic anhydride, 1,2,3,6-tetrahydrophthalic anhydride, bicyclo (2.2.2) oct-5-ene-2,3-dicarboxylic acid anhydride, 1,2,3,4,5,8,9,10-octahydronaphthalene-2,3-dicarboxylic acid anhydride, bicyclo (2.2.1) hept-5-ene-2,3-dicarboxylic acid anhydride, tnorborn-5-ene-2,3-dicarboxylic acid anhydride, nadic anhydride, methyl nadic anhydride, himic anhydride,
methyl himic anhydride and x-methylbicyclo (2.2.1) hept-5-ene-2,3-dicarboxylic acid anhydride;
or
the acid anhydride monomer (of the ethylenically unsaturated acid of the core
or the shell in the vinyl aromatic-based polymer (B-2) is selected from the group consisting of maleic anhydride, acrylic anhydride, methacrylic anhydride, itaconic anhydride, citraconic anhydride, butenedioic anhydride and/or fumaric anhydride;
or
the ester of the ethylenically unsaturated acid in the vinyl aromatic-based
polymer (B-1) or (B-2) is independently C1-C18 alkyl ester and/or C1-C18 hydroxy alkyl ester of ethylenically unsaturated carboxylic acid;
or
the epoxy compound of the ethylenically unsaturated acid in the vinyl
aromatic-based polymer (B-1) is selected from the group consisting of glycidyl (meth) acrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, diglycidyl ester of butenetricarboxylic acid, triglycidyl ester of butenetricarboxylic acid, vinyl glycidyl ether, allyl glycidyl ether, 2-methylallyl glycidyl ether, phenyl glycidyl ether and 4-vinylbenzyl glycidyl ether;

or
the amide of the ethylenically unsaturated acid in the vinyl aromatic-based
polymer (B-1) is selected from the group consisting of allylamine, aminoethyl methacrylate, aminopropyl methacrylate, dimethyaminoethyl methacrylate, acrylamide, methacrylamide, maleic acid monoamide, maleic acid diamide, maleic acid N-monoethylamide, maleic acid N,N-diethylamide, fumaric acid monoamide and fumaric acid diamide;
or
the imide of the ethylenically unsaturated acid in the vinyl aromatic-based
polymer (B-1) is selected from the group consisting of maleimide, N-butylmaleimide, N-phenylmaleimide and N-cyclohexylmaleimide;
or
the melt salt of the ethylenically unsaturated acid in the vinyl aromatic-based
polymer (B-1) is selected from the group consisting of sodium acrylate, calcium acrylate, sodium methacrylate and calcium methacrylate.

7. The polybutylene terephthalate composition according to claim 1, wherein the conjugated diene monomer (b3) is present and is selected from the group consisting of 1,3-butadiene, 2,3-dimethyl-1,3-butadiene, 2-ethyl-1,3-butadiene, 2- methyl-1,3-pentadiene, 1,3-pentadiene, isoprene, 1,3-hexadiene, 4,5-diethyl-1,3-octadiene and 3-butyl-1,3-octadiene.

8. The polybutylene terephthalate composition according to claim 1, wherein the vinyl aromatic-based polymer (B-1) is present and is constituted of:
the vinyl aromatic monomer (b1), and at least one selected from the group consisting of the ethylenically unsaturated monomer (b2) and the conjugated diene monomer (b3);
or
the vinyl aromatic-based polymer (B-1) is constituted of the vinyl aromatic
monomer (b1) which is selected from the group consisting of styrene, alpha- methylstyrene, 2-methylstyrene, 3-methylstyrene and 4-methylstyrene, and component (i) which is selected from the group consisting of (meth) acrylic acid, maleic acid, maleic anhydride, methyl (meth) acrylate and glycidyl (meth) acrylate, and optionally component (ii) which is selected from the group consisting of 1,3-butadiene, 1,3-pentadiene, acrylonitrile and methacrylonitrile;
or
the vinyl aromatic-based polymer (B-1) is a block, alternating, random or
grafted copolymers of styrene-maleic anhydride, styrene-acrylonitrile-maleic anhydride, styrene-(meth) acrylate, styrene-methyl (meth) acrylate, styrene-glycidyl (meth) acrylate, styrene-acrylonitrile-glycidyl (meth) acrylate, styrene-acrylic acid, styrene- acrylic acid-a-methylstyrene, styrene-butadiene, styrene-acrylonitrile and styrene-butadiene- acrylonitrile.

9. The polybutylene terephthalate composition according to claim 1, wherein in the vinyl aromatic-based polymer (B-2) is present and,
the core comprises units derived from at least one vinyl aromatic
monomer (b1), and at least one conjugated diene monomer (b3);
or
the core comprises units derived from at least one vinyl aromatic
monomer (b1), at least one conjugated diene monomer (b3), and at least one
monomer selected from the group consisting of ethylenically unsaturated nitrile, and $C_1$-$C_4$ alkyl ester of ethylenically unsaturated acid;
or
the core comprise units derived from at least one vinyl aromatic
monomer (b1), and at least one monomer selected from the group consisting of $C_1$-$C_4$ alkyl ester of ethylenically unsaturated acid, ethylenically unsaturated acid and ethylenically unsaturated nitrile;
or
the shell comprises units derived from at least one ester of the ethylenically unsaturated acid and/or at least one vinyl aromatic monomer (b1);
or
the shell comprises units derived from at least one selected from the group
consisting of $C_1$-$C_4$ alkyl ester of the ethylenically unsaturated acid and vinyl aromatic monomer (b1), and one monomer (iii) selected from the group consisting of ethylenically unsaturated nitrile monomer, ethylenically unsaturated acid monomer, acid anhydride and/or C10-C20 alkyl ester of the ethylenically unsaturated acid; the monomer (iii) is at least one selected from the group consisting of acrylonitrile, methacrylonitrile, 2-ethylhexyl acrylate, decyl acrylate, lauryl methacrylate, stearyl methacrylate and/or stearyl acrylate.

10. The polybutylene terephthalate composition according to claim 1, wherein (B-2) is present and in the vinyl aromatic-based polymer (B-2), the core comprises units derived from at least one vinyl aromatic monomer (b1) and at least a conjugated diene monomer (b3); the shell comprises units derived from $C_1$-$C_4$ alkyl ester and/or $C_1$-$C_4$ hydroxy alkyl ester of (meth) acrylic acid or acetic acid.

11. The polybutylene terephthalate composition according to claim 1, wherein (B-2) is present and in the vinyl aromatic-based polymer (B-2), a weight ratio of the core to the shell is 90:10 to 50:50.

12. The polybutylene terephthalate composition according to claim 1, wherein the vinyl aromatic monomers (b1) in the vinyl aromatic-based polymer (B-1) are in an amount of from 70 mol % to 99.5 mol %, based on the total monomers which constitutes the vinyl aromatic-based polymer (B-1).

13. The polybutylene terephthalate composition according to claim 1, wherein (B-2) is present and in the vinyl aromatic-based polymer (B-2) includes one inner graft stage comprising units derived from graft-linking monomers comprising at least one vinyl aromatic monomer, and/or at least one C1-C4 alkyl ester of (meth) acrylic acid monomer; and optional one intermediate sealer stage comprising at least one of the following monomers: a C1-C8 alkyl acrylate or a polyunsaturated crosslinker, the intermediate sealer stage is between the inner graft stage and the shell.

14. The polybutylene terephthalate composition according to claim 1, wherein the vinyl aromatic-based polymer (B-2) is present and comprises: from 70 to 85 weight parts of the core; from 8 to 14 weight parts of an inner graft stage; from 0.1 to 5 weight parts of an intermediate sealer stage; and from 10 to 16 weight parts of the shell.

15. The polybutylene terephthalate composition according to claim 1, wherein the polybutylene terephthalate composition comprises up to 40 wt % of vinyl aromatic-based polymer (B-1), based on the total weight of the polybutylene terephthalate composition;

or the polybutylene terephthalate composition comprises from 1 to 20 wt % of vinyl aromatic-based polymer (B-2), based on the total weight of the polybutylene terephthalate composition.

16. The polybutylene terephthalate composition according to claim 1, the polybutylene terephthalate composition further comprises as component (D) polyester copolymer with melting point (Tm) from 105° C. to 185° C., as component (E) glass bubbles, and/or as component (F) additives.

17. The polybutylene terephthalate composition according to claim 16, wherein the polybutylene terephthalate composition comprises 20 wt % to 70 wt % of polybutylene terephthalate resin, up to 40 wt % of vinyl aromatic-based polymer (B-1) or 1 to 20 wt % of vinyl aromatic-based polymer (B-2), 5 wt % to 40 wt % of reinforcement agents (C), 0 wt % to 40 wt % of component (D), and 0 wt % to 20 wt % of glass bubbles (E), based on the total weight of polybutylene terephthalate composition.

18. The polybutylene terephthalate composition according to claim 1, comprising glass bubbles and wherein the at least one reinforcement agent comprises glass fiber.

19. An article used as parts or components of frame, housing or package of mobiles, sensors or laptops, or antenna of mobiles or vehicles comprising a polybutylene terephthalate composition according to claim 1.

20. A process for preparing a polybutylene terephthalate composition according to claim 1, comprising (1) mixing the polybutylene terephthalate resin (A), the vinyl aromatic-based polymer (B), optional low melting point polyester (D) and optional additives (F), (2) adding the reinforcing agent (C), optional (3) adding the glass bubbles (E), and extruding or kneading.

21. A method of decreasing dielectric constant and dielectric loss of polybutylene terephthalate resin comprising adding a vinyl aromatic-based polymer (B) comprising units that are derived from vinyl aromatic monomers, wherein the vinyl aromatic-based polymer (B) is vinyl aromatic-based polymer (B-1) and/or (B-2);

wherein the vinyl aromatic-based polymer (B-1) comprises units derived from 50 mol % to 100 mol % of at least one vinyl aromatic monomer (b1), based on the total monomers which constitutes the vinyl aromatic-based polymer (B-1); and optionally units derived from at least one ethylenically unsaturated monomer (b2) and/or one conjugated diene monomer (b3);

wherein the vinyl aromatic monomers (b1) in the vinyl aromatic-based polymer (B-1) are in present an amount of from 60 mol % to 99.5 mol %, based on the total monomers which constitutes the vinyl aromatic-based polymer (B-1);

wherein the vinyl aromatic-based polymer (B-2) is a core-shell polymer comprising a core and a shell, the core is derived from a first monomer comprising at least one vinyl aromatic monomer (b1), and optionally at least one selected from the group consisting of ethylenically unsaturated monomer (b2) and conjugated diene monomer (b3); the shell is derived from a second monomer comprising at least one monomer selected from the group consisting of vinyl aromatic monomer (b1) and ethylenically unsaturated monomer (b2);

and wherein the weight ratio of the core to the shell in the core-shell polymer is 90:10 to 10:90, and wherein in the vinyl aromatic-based polymer (B-2), the core comprises from 5 wt % to 80 wt % of units derived from at least one vinyl aromatic monomer (bl) and from 20 wt % to 95wt % of units derived from at least one conjugated diene monomer (b3), based on the total units of the core.

* * * * *